(12) United States Patent
Huettenegger

(10) Patent No.: US 6,491,247 B2
(45) Date of Patent: Dec. 10, 2002

(54) RECORDING AND/OR REPRODUCING APPARATUS INCLUDING A REEL DISC HAVING A MAGNETIC CIRCUIT ELEMENT AND DRIVE TEETH REALIZED BY INSERT-MOLDING

(75) Inventor: Heimo Huettenegger, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 61 days.

(21) Appl. No.: 09/790,299

(22) Filed: Feb. 21, 2001

(65) Prior Publication Data

US 2002/0005446 A1 Jan. 17, 2002

(30) Foreign Application Priority Data

Feb. 24, 2000 (EP) ............................. 00890055
Mar. 15, 2000 (EP) ............................. 00890081

(51) Int. Cl.[7] .............................................. G03B 23/02
(52) U.S. Cl. ...................... 242/342; 242/611; 360/93; 360/132
(58) Field of Search ................. 242/340, 342, 242/348, 356, 611, 611.1; 360/85, 93, 132

(56) References Cited

U.S. PATENT DOCUMENTS

| 3,857,531 | A | * | 12/1974 | Jantzen ...................... 242/342 |
| 4,494,712 | A | * | 1/1985 | Godwin et al. |
| 4,508,280 | A | * | 4/1985 | Hayosh et al. |
| 4,774,603 | A | * | 9/1988 | Dong et al. |
| 5,366,173 | A | * | 11/1994 | Lammers et al. |
| 6,273,352 | B1 | * | 8/2001 | Johnson et al. .............. 242/340 |
| 6,279,845 | B1 | * | 8/2001 | Hemzacek et al. .......... 242/340 |

FOREIGN PATENT DOCUMENTS

| WO | WO9844499 | 10/1998 |
| WO | WO9844506 | 10/1998 |

\* cited by examiner

Primary Examiner—William A. Rivera

(57) ABSTRACT

In a recording and/or reproducing apparatus (1) having a reel drive device (35) with a drive shaft (46A) and with a disc-shaped drive member (47) made of a plastic and with drive teeth (48), and with a second magnetic circuit element (49), and with a third magnetic circuit element (50), which is connected to the drive member (47) by insert-molding of the third magnetic circuit element (50), the drive shaft (46A) is connected directly to the third magnetic circuit element (50) in a rotationally interlocked manner and the third magnetic circuit element (50) is formed by an element which is finished by means of a turning operation, and the third magnetic circuit element (50) is dimensioned in such a manner with respect to the drive member (47) that the third magnetic circuit element (50) is not subjected to any deformation by the drive member (47) made by insert-molding.

8 Claims, 4 Drawing Sheets

RECORDING AND/OR REPRODUCING APPARATUS INCLUDING A REEL DISC HAVING A MAGNETIC CIRCUIT ELEMENT AND DRIVE TEETH REALIZED BY INSERT-MOLDING

BACKGROUND OF THE INVENTION

Information about a known recording and/or reproducing apparatus as defined in the opening part of claim 1 and information about a cassette with a magnetic tape as record carrier tape for such a recording and/or reproducing apparatus is obtainable via the internet, namely at the internet address "www.lto-technology.com". In connection with the known recording and/or reproducing apparatus and the known cassette reference may also be made to the two patent documents WO 98/44506 A2 and WO 98/44499 A1.

The invention relates to a recording and/or reproducing apparatus as defined in the opening part of claim 1.

Information about a known recording and/or reproducing apparatus as defined in the opening part of claim 1 and information about a cassette with a magnetic tape as record carrier tape for such a recording and/or reproducing apparatus is obtainable via the internet, namely at the internet address "www.lto-technology.com". In connection with the known recording and/or reproducing apparatus and the known cassette reference may also be made to the two patent documents WO 98/44506 A2 and WO 98/44499 A1.

In a known recording and/or reproducing apparatus, whose reel drive device 35 is shown in sectional view in FIG. 11, a sleeve B is press-fitted onto the drive shaft 46A in the area of one end of the drive shaft 46A, which sleeve B has two circumferential recesses C and D, the third magnetic circuit element 50 being accommodated in the area of the recess C situated nearer the free end of the drive shaft 46A and having a clearance with respect to the recess C of the sleeve B and a ring-shaped portion E of the plastic drive member x formed by insert-molding of the sleeve B and the third magnetic circuit element 50 being accommodated in the second recess D, which precludes a relative axial movement between the drive member 47 and the sleeve B and, consequently, the drive shaft 46A, because of the force fit (press fit) between the sleeve B and the drive shaft 46A. In this construction the third magnetic circuit element 50 is formed by a comparatively thin steel disc 50 having a thickness of approximately 1.0 mm, which is made by a punching operation and serves as a magnetic return path. An annular magnet 49 forming a second magnetic circuit element 49 is connected to the comparatively thin steel disc, namely by means of an adhesive joint.

In the known recording and/or reproducing apparatus it has been found that as a result of the insert-molding of the comparatively thin steel disc 50 in a plastic in order to form the drive member 47 including its drive-member-side drive teeth 48 the comparatively thin steel disc 50 is subject to substantial mechanical loads owing to so-called shrinkage of the plastic, which gives rise to distortion and warping as well as an additional twisting of the steel disc 50. These deformations of the steel disc 50 result not only in the steel disc 50 having a non-perfect flat shape but also in the drive teeth 48 of the drive member 47 being subjected to such a strong deformation that this has an undesired and negative effect on the effective tooth height, which should be as constant as possible. Owing to the afore-mentioned deformation the drive-member-side drive teeth 48 are disposed at different axial levels, as a result of which these drive-member-side drive teeth 48 do not guarantee a satisfactorily uniform cooperation with the drive teeth of the reel toothing of a supply reel accommodated in a cassette. In operation of the known recording and/or reproducing apparatus a consequence of the varying axial height positions of the drive-member-side drive teeth 48 is that via the reel teeth and the supply reel the drive-member-side drive teeth 48, whose height position varies, exert a disturbing influence in the direction of the tape width on the magnetic tape unwound from or wound onto the supply reel, as a result of which variations occur in the height position of the magnetic tape, the frequency of said variations being dependent on, inter alia, the winding diameter. These variations in the height position can no longer be compensated by an actuator device carrying a magnetic head for scanning the tracks on the magnetic tape, as a result of which a correct recording and reproduction may be adversely affected or may even be impossible.

SUMMARY AND OBJECTS OF THE INVENTION

It is an object of the invention to preclude the afore-mentioned problems and to provide an improved recording and/or reproducing apparatus.

To achieve the afore-mentioned object, according to the invention, the characteristic features defined in the characterizing part of claim 1 are provided in a recording and/or reproducing apparatus as defined in the opening part of claim 1. Owing to the provision of the characteristic features in accordance with the invention it is achieved in a simple manner that as a result of the direct connection of the drive shaft to the third magnetic circuit element and as a result of the finish of the magnetic circuit element by a turning operation, which is preferably effected after the connection of the third magnetic circuit element to the drive shaft, the third magnetic circuit element is oriented exactly perpendicularly to the drive shaft and, owing to its dimensioning in accordance with the invention, has such a rigid and non-deformable construction that insert-molding of the third magnetic circuit element, in order to form the drive member including its drive-member-side drive teeth, cannot lead to any warping, twisting or deformation of the third magnetic circuit element and, consequently, of the drive teeth connected to the third magnetic circuit element. Thus, by means of the measures in accordance with the invention it is achieved that all the drive-member-side drive teeth are disposed at the same axial level with a high accuracy. This has the advantage that during cooperation of the drive-member-side drive teeth with reel teeth of a supply reel of a cassette no undesirable influences are exerted on the magnetic tape and, consequently, the height position of the magnetic tape is not adversely affected, as a result of which a correct recording and reproduction is not disturbed or impaired by causes attributable to the drive-member-side drive teeth or the reel drive device.

In a recording and/or reproducing apparatus in accordance with the invention it has proved to be very advantageous when, in addition, the measures defined in claims 2 to 8 are taken. Tests have shown that these measures are particularly advantageous, particularly in view of an optimum compromise between, on the one hand, the size, the stability and non-deformability of the drive member and, on the other hand, the required space and the required mass of the drive member.

The above-mentioned as well as further aspects of the invention will become apparent from the embodiments described hereinafter by way of example and will be elucidated with reference to these examples.

The invention will now be described in more detail with reference to the drawings, which show two embodiments given by way of example but to which the invention is not limited.

DESCRIPTION OF THE PREFERRED EMBODIMENTS

Figure 1:
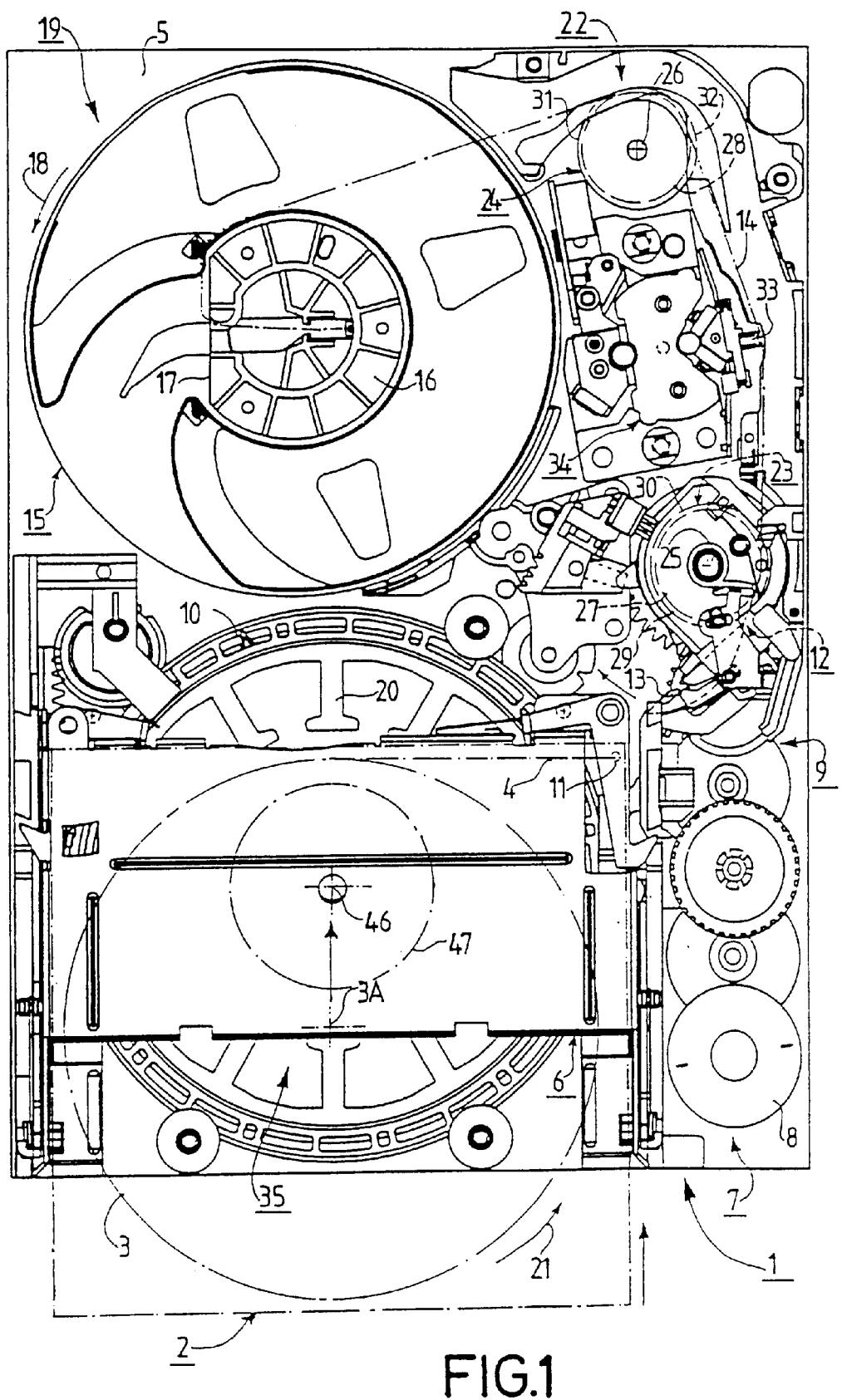
FIG. 1 is a plan view which shows a recording and/or reproducing apparatus in accordance with a first-embodiment of the invention, which apparatus includes a disc-shaped drive member for driving a supply reel.
Figure 2:
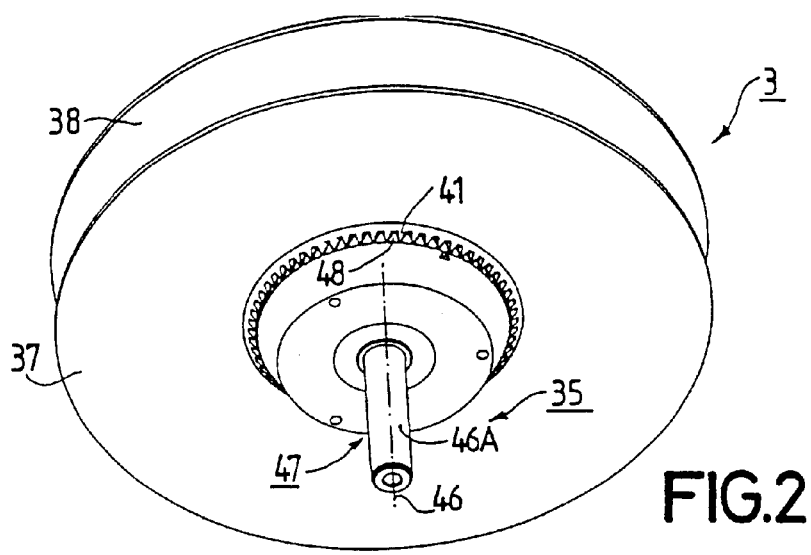
FIG. 2 shows in an oblique view from underneath the disc-shaped drive member of the recording and/or reproducing apparatus shown in FIG. 1 and a supply reel placed on the drive member.
Figure 3:
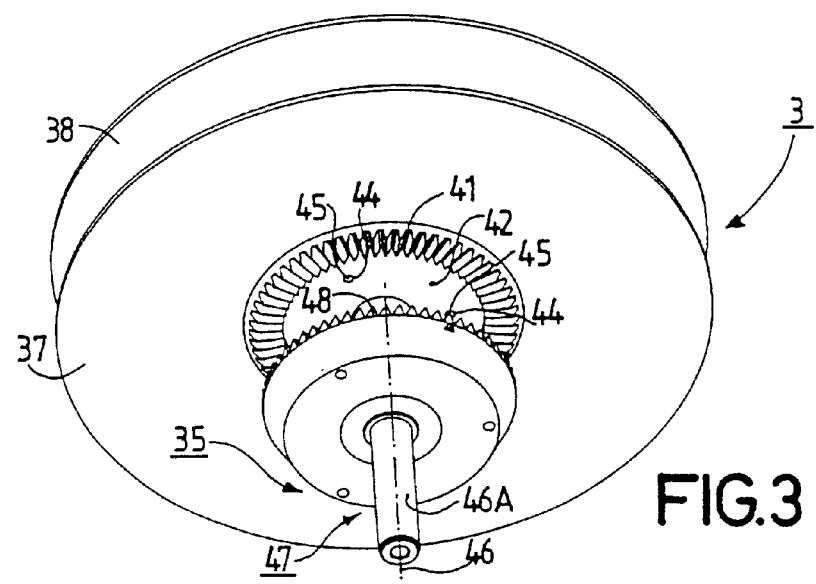
FIG. 3 shows, in a manner similar to FIG. 2, the disc-shaped drive member and the supply reel of FIG. 2, the supply reel being shown in a situation in which it is lifted off the drive member.
Figure 4:
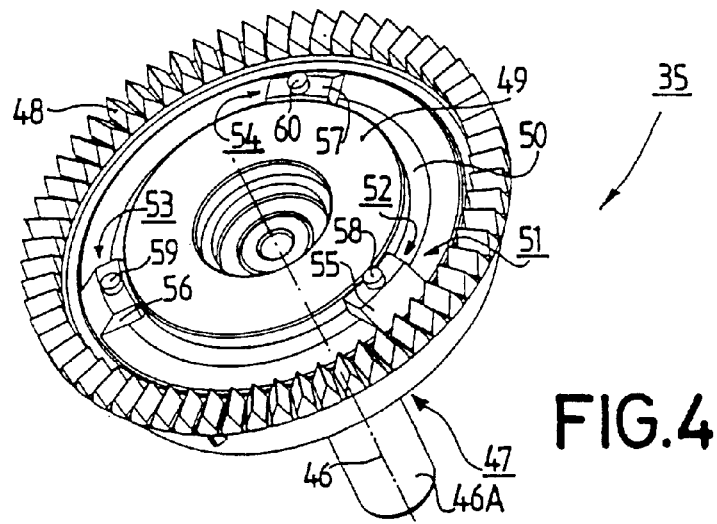
FIG. 4 is an oblique plan view which shows the disc-shaped drive member of FIGS. 2 and 3.

FIG. 1 shows a recording and reproducing apparatus 1 which serves to and is configured for the recording and reproduction of digital data and by means of which a large amount of data can be stored. The recording and reproducing apparatus 1 is briefly referred to hereinafter as the storage apparatus 1.

The storage apparatus 1 is a development of a recording and reproducing apparatus which includes features forming the subject matter of nine patent- applications in total, namely the European priority patent applications bearing the application numbers 98 890 332.4, 98 890 333.2, 98 890 334.0, 98 890 335.7, 98 890 336.5, 98 890 337.3, 98 890 338.1, 98 890 339.9 and 98 890 340.7 filed on Nov. 12, 1998. Said recording and reproducing apparatus was already shown at the Comdex fair of Las Vegas in the USA from Nov. 15, 1998 and is consequently known. The disclosure represented by the exhibited recording and reproducing apparatus and for a substantial part contained in the nine afore-mentioned European priority patent applications is incorporated herein by reference. For this reason, the remainder of the description of the storage apparatus shown in FIG. 1 is limited to only those areas and parts which are relevant in the present context. Furthermore, in the present context reference is also made to the two European priority patent applications bearing the application numbers 99 890 360.3 and 99 890 361.1, both filed on Nov. 11, 1999.

The storage apparatus is adapted to hold a cassette 2, which is shown only in dash-dot lines in FIG. 1. The cassette 2 accommodates a supply reel 3, which is rotationally drivable with respect to a reel axis 3A and which serves to and is adapted to take up (wind) a magnetic tape 4, which tape as well as the supply reel 3 are shown merely as dash-dot lines in FIG. 1. The magnetic tape 4 can be scanned along a plurality of tracks which extend in the longitudinal direction of the magnetic tape 4, in order to record or reproduce digital data.

The storage apparatus 1 has a chassis 5 which carries the individual constructional units and parts of the storage apparatus 1. Hereinafter, only those of the constructional units and parts are mentioned which are relevant in the present context.

For holding a cassette 2 and moving it from a loading position into an operating position in the storage apparatus 1 the storage apparatus 1 has a movable cassette holder 6. The movable cassette holder 6 is movable along an L-shaped path of movement between a loading position, in which a cassette 2 can be inserted into the cassette holder 6, and an operating position, in which an inserted cassette 2 is in its operating position.

To move the cassette holder 6 and further movable apparatus parts of the storage apparatus 1 the storage apparatus 1 has drive means 7. The drive means 7 include a motor 8 and a gear mechanism 9, by means of which a ring-shaped drive gear wheel 10 is drivable. With the aid of the ring-shaped drive gear wheel 10 cam devices, by means of which the movable cassette holder 6 is movable, can be driven via gear racks.

When the cassette holder 6 is in its operating position a cassette 2 loaded into the cassette holder 6 is also in its operating position. As already stated, the cassette 2 accommodates a supply reel 3 on which the magnetic tape 4 is wound. At the free end of the magnetic tape 4 the magnetic tape 4 is connected to a coupling pin 11. In the operating position of the cassette 2 pull-out means 12 can be coupled to the coupling pin 11, which means include a pull-out element 13 and a pull-out tape 14. For the clarity of the drawing the pull-out tape 14 is shown as a dash-dot line in FIG. 1. The pull-out tape 14 is passed from pull-out element 13 to a take-up reel 15 and is fixedly connected to a hub portion 16 of the take-up reel 15. The hub portion 16 has a recess 17 which is adapted to receive the pull-out element 13. By means of a first motor, not shown, of the storage apparatus 1 the take-up reel 15 is rotationally drivable in a direction indicated by an arrow 18. The rotational drive of the take-up reel 15 enables the pull-out tape 14 and, consequently, the pull-out element 13 to be driven, as a result of which, after coupling of the pull-out element 13 to the coupling pin 11, the magnetic tape 4 can be pulled out of the cassette 2 with the aid of the pull-out tape 14 and can be moved up to the take-up reel 15 and can be wound onto the take-up reel 15, upon which recording on or reproducing from the magnetic tape 4 is possible.

The storage apparatus 1 has drive means 19 for driving the magnetic tape 4. The drive means 19 include the first motor, not shown, which has been provided in the storage apparatus 1 in order to drive the take-up reel 15 and which drives the take-up reel 15 with the aid of a drive member, not shown, which also forms a part of the drive means 19. The drive means 19 further include a second motor, which is not shown completely. FIG. 1 only shows a stator section 20 of the second motor, which stator section carries excitation coils, not shown, by means of which a rotor, not shown, of this second motor can be driven. The second motor can drive crown-like gear teeth which mesh with mating gear teeth provided on the supply reel 3, the supply reel 3 thus being drivable in a direction indicated by an arrow 21 by means of the second motor to wind the magnetic tape 4 onto the supply reel 3. Thus, the supply reel 3 also forms a part of the drive means 19. The two kinds of gear teeth will be described in greater detail hereinafter.

The storage apparatus 1 further has guide means 22 for guiding the magnetic tape 3. In the present case the guide means 22 include two tape guide rollers 23 and 24. Each of the two tape guide rollers 23 and 24 has a guide shafts, 25 and 26 respectively, which are stationarily connected to the chassis 5, and a guide surface, 27 and 28 respectively, which is cylindrical with respect to the respective guide shaft 25 or 26. Further, each of the two tape guide rollers 23 and 24 has an end flange, 29, 30 and 31, 32 respectively, in the area of each of the two axial ends of the respective cylindrical guide surfaces 27 and 28, which end flanges extend transversely to the respective guide shafts 25 and 26.

The storage apparatus 1 further has a multi-track magnetic head 33 which serves for scanning the magnetic tape 4. The magnetic head 33 is mounted on an actuator device 34 by means of which the magnetic head 33 is movable in a direction perpendicular to the longitudinal direction of the magnetic tape 4 to keep the individual magnet systems of the multi-track magnetic head 33 constantly aligned with respect to the scanning tracks of the magnetic tape 4, so as to guarantee an exact tracking. The magnetic head 33 is arranged in the area between the two tape guide rollers 23 and 24. With the aid of the actuating device 34 the magnetic head 33 can follow variations in the height position of the magnetic tape 3.

As already stated hereinbefore, the storage apparatus 1 further includes a second motor, of which only the stator section 20 is shown in FIG. 1. The second motor forms a part of a reel drive device 35 which serves to and is adapted to rotationally drive the supply reel 3 of the cassette 2.

As regards the supply reel 3 it is to be mentioned in addition (see FIGS. 2 to 8) that the supply reel 3 consists of a plastic and has a substantially pot-shaped hub portion 36 which is integral with a first reel flange 37 and a second reel flange 38. The pot-shaped hub portion 36 has a bottom wall 39 and a cylindrical circumferential wall 40. In a manner not shown the magnetic tape 4 has one end attached to the circumferential wall 40 and is subsequently wound up, the tape spool thus formed being disposed between the two reel flanges 37 and 38.

In the area of the bottom wall 39 the supply reel 3 is connected to, i.e. is integral with, a reel-side reel drive means 41. Here, the reel-side reel drive means 41 is formed by reel teeth 41.

In the area of its bottom wall 39 the supply reel 3 is further connected to a first magnetic circuit element 42, which serves to form magnetically acting holding means 43 for holding the supply reel 3 in the storage apparatus 1. The first magnetic circuit element 42 is formed by a circular disc, which forms a magnetic yoke and which consists of a low-carbon steel having a nickel cladding to protect it. The first magnetic circuit element 42 has a total of three angularly equispaced bores 44, which are each engaged by a projection 45 which extends from the bottom wall 39. The first magnetic circuit element 42 is connected to the bottom wall 39 of the supply reel 3 by insert-molding.

The reel drive device 35 has a rotationally drivable drive shaft 46A and a disc-shaped drive member 47 which is rotationally drivable with respect to a disc axis 46 by means of the drive shaft 46A and which is shown only as a dash-dot line in FIG. 1. The disc-shaped drive member 47 has a drive-member-side reel drive means 48, which in the present case is formed by drive teeth 48. The drive teeth 48 serve to and are adapted to cooperate in a driving fashion with the reel teeth 41, i.e. with the reel-side reel drive means 41. The drive teeth 48 are integral with the drive member 47. The drive member 47, just as the supply reel 3, is made of a plastic.

The drive member 47 is connected to a second magnetic circuit element 49 provided with the magnetically acting holding means 43 for holding the supply reel in the storage apparatus 1. Here, the second magnetic circuit element 49 is formed by an annular magnet 49. The magnet 49 consists of a neodymium-iron-boron compound.

Furthermore, a third magnetic circuit element 50 is connected to the disc-shaped drive member 47, the connection being made by insert-molding. The third magnetic circuit element 50 is basically annular and also forms a magnetic yoke. The third magnetic circuit element 50 consists of a stainless steel. The provision of the third magnetic circuit element 50 results in a small stray field and a high efficiency of the magnetically acting holding means 43.

It is to be noted that the second magnetic circuit element 49, which is formed by a magnet, and the third magnetic circuit element 50 are connected to one another by the magnetic force of attraction. In addition, an adhesive joint, not shown in the Figures, is provided between the second magnetic circuit element 49 and the third magnetic circuit element 50, in order to guarantee an increased reliability for the connection between the second magnetic circuit element 49 and the third magnetic circuit element 50.

In the storage apparatus 1 the disc-shaped drive member 47 is advantageously provided with magnetic-force-of-attraction limiting means 51 which serve to and are adapted to cooperate with the first magnetic circuit element 42. With the aid of the magnetic-force-of-attraction limiting means 51 the magnetic force of attraction produced between the first magnetic circuit element 42 and the second magnetic circuit element 49 can be limited to a given value. This given value is dictated by a given minimum axial distance between the first magnetic circuit element 42 and the second magnetic circuit element 49.

In the storage apparatus 1, i.e. in the disc-shaped drive member 47 the magnetic-force-of-attraction limiting means 51 are formed by three projections 52, 53 and 54, which project from the drive member 47 in the direction of the disc axis 46. The three projections 52, 53 and 54 are situated on a circle which is coaxial with the disc axis 46 and are angularly equispaced. The construction of the three projections 52, 53 and 54 is apparent from FIGS. 4 to 8. Each of the three projections 52, 53 and 54 consists of a block-shaped basic portion 55, 56 and 57, respectively, and of a stud portion 58, 59 and 60, respectively. Each of the three basic portions 55, 56 and 57, as is shown for the second projection 53 in FIGS. 5 to 8, is integrally connected to the disc-shaped drive member 47 via a limb 61.

Figure 5:
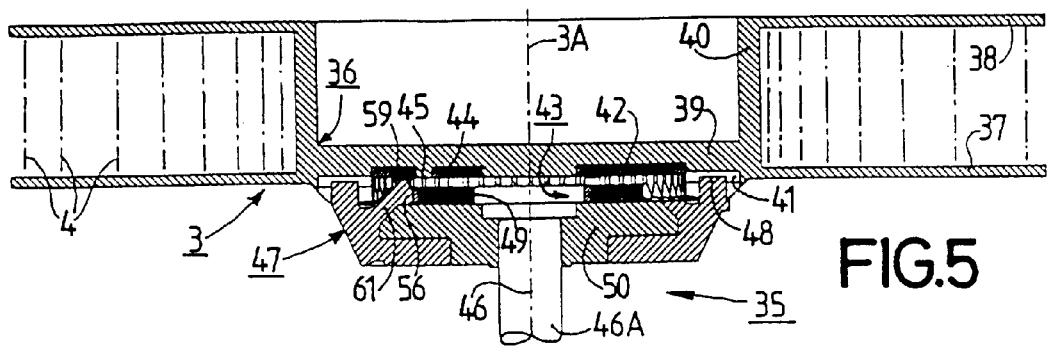
FIG. 5 is a cross-sectional view which shows the disc-shaped drive member of FIGS. 2, 3 and 4 and the supply reel of FIGS. 2 and 3, the relative axial position of the supply reel with respect to the disc-shaped drive member being defined by drive teeth.
Figure 6:
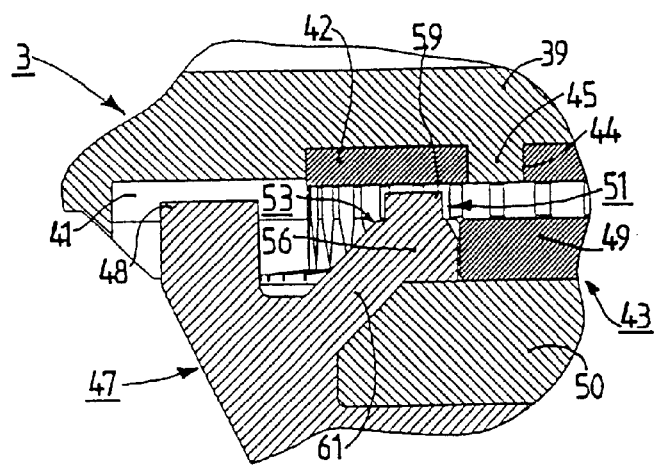
FIG. 6 shows a part of FIG. 5 to an enlarged scale in comparison with FIG. 5.

FIGS. 5 and 6 illustrate a normal operating situation, in which the first magnetic circuit element 42 of the supply reel 3 is properly and faultlessly connected to the bottom wall 39 of the supply reel 3. In this normal operating situation the three projections 52, 53 and 54 have no effect, as is apparent particularly from FIG. 6. In fact, the three projections 52, 53 and 54 do not come into contact with the first magnetic circuit element 42. Therefore, the relative axial position of the supply reel 3 and, consequently, of the first magnetic circuit element 42 with respect to the disc-shaped drive member 47 and, consequently, with respect to the second magnetic circuit element 49 is determined by the reel teeth 41 and the drive teeth 48, which teeth 41 and 48, i.e. their tooth flanks, intermesh under the influence of the force exerted by the magnetically acting holding means 43. Thus, in this normal operating situation the magnetic force of attraction between the first magnetic circuit element 42 and the second magnetic circuit element 49 is determined by the axial distance between the first magnetic circuit element 42 and the second magnetic circuit element 49, which distance is defined by means of the reel teeth 41 and the drive teeth 48.

Figure 7:
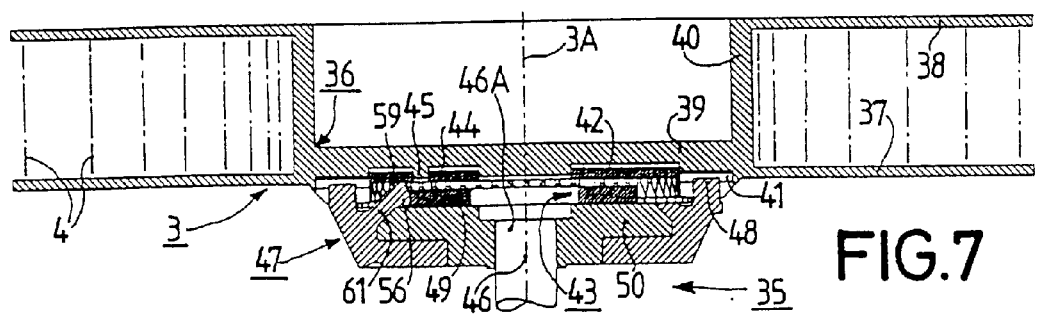
FIG. 7 shows the disc-shaped drive member and the supply reel in a manner similar to FIG. 5, the relative axial position of the supply reel with respect to the disc-shaped drive member being defined by three projections of the disc-shaped drive member.
Figure 8:
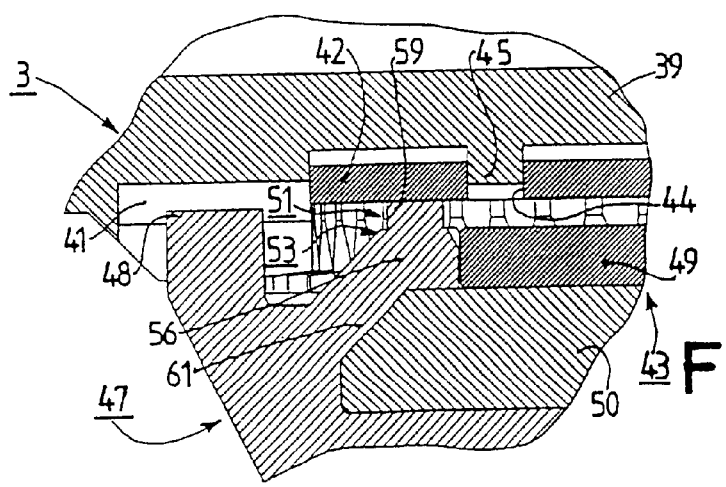
FIG. 8 shows a part of FIG. 7 in a manner similar to FIG. 6.

FIGS. 7 and 8 show a supply reel 3, whose first magnetic circuit element 42—whatever the cause—does not occupy a specified correct position on the supply reel 3. As is apparent from FIGS. 7 and 8, the first magnetic circuit element 42 shown in FIGS. 7 and 8 has too large an axial distance from the bottom wall 39 of the supply reel 3. This excessive distance may have originated during the production of the supply reel 3. Alternatively, the excessive distance may have arisen after frequent use of the supply reel 3 or rather of the cassette 2 including the supply reel 3.

When the supply reel shown in FIGS. 7 and 8 has been loaded into the storage apparatus 1 shown in FIG. 1 and no precautionary measures in the form of the magnetic-force-of-attraction limiting means 51 had been provided in the storage apparatus 1 and the disc-shaped drive member 47 of the storage apparatus 1, this would result in the first magnetic circuit element 42 being situated at such a small axial distance from the second magnetic circuit element 49 that a given maximum permissible magnetic force of attraction between the first magnetic circuit element 42 and the second magnetic circuit element 49 would be exceeded. The result of this might be that the first magnetic circuit element 42 could no longer be detached from the second magnetic circuit element 49 or could be detached only through an undesired separation of the connection between the first magnetic circuit element 42 and the bottom wall 39 of the supply reel 3, which is obviously undesirable.

The provision of the magnetic-force-of-attraction limiting means 51 precludes the undesirable situation described above in the storage apparatus 1 and the disc-shaped drive member 47 in an advantageous manner, namely in that—as is apparent in particular from FIG. 8—the three projections 52, 53 and 54 operatively engage with the first magnetic circuit element 42, as a result of which the first magnetic circuit element 42 abuts with the stud portions 58, 59 and 60 in this operating situation. This guarantees that the axial distance between the first magnetic circuit element 42 and the second magnetic circuit element 49 is determined by the difference in axial level between the free ends of the stud portions 58, 59 and 60 and the free end surface of the second magnetic circuit element 49. Thus, it is guaranteed by simple means and in a very reliable manner that the distance between the first magnetic circuit element 42 and the second magnetic circuit element 49 defined by said difference in level can never become smaller, as a result of which the magnetic force of attraction between the two magnetic circuit elements 42 and 43 can never exceed a given value. Thus, undesirably high magnetic forces of attraction are precluded in a reliable manner.

With regard to the reel drive device 35 it is to be noted that the drive shaft 46A is preferably mounted in a bore of the third magnetic circuit element 50 and is locked in rotation to the third magnetic circuit element 50. In the present case, the connection between the drive shaft 46A and the third magnetic circuit element 50 is made by pressing, so that a press fit exists between the drive shaft 46A and the third magnetic circuit element.

The third magnetic circuit element 50 is suitably formed by an element which is finished by means of a turning operation. To manufacture the reel drive device 35 a preformed element is pressed onto the drive shaft 46A and is subsequently finished by means of a turning operation, which guarantees that the element forming the third magnetic circuit element 50 has bounding surfaces which extend exactly perpendicularly to the drive shaft 46A and the third magnetic circuit element 50 consequently cannot cause axial wobbling.

Figure 9:
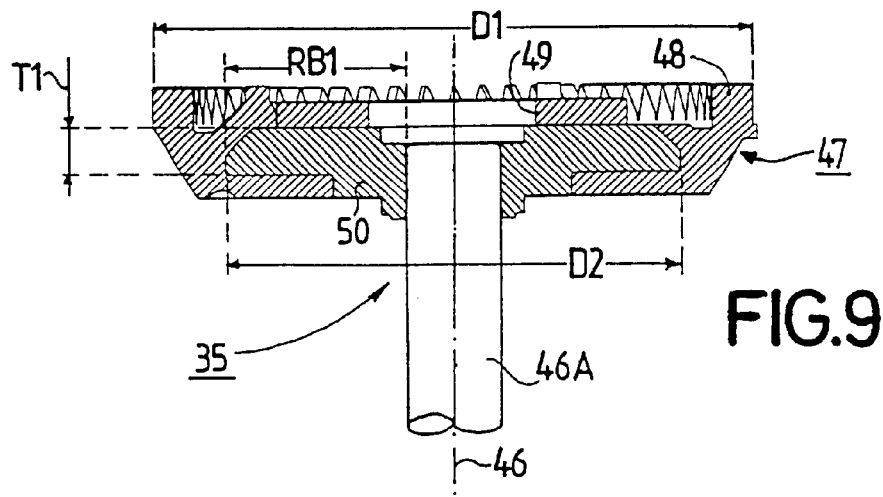
FIG. 9 is a cross-sectional view of the reel drive device of the recording and reproducing apparatus shown in FIG. 1.

Furthermore, it is advantageous for the reel drive device 35 when the outer diameter D1 of the drive-member-side drive teeth 48 and the outer diameter D2 of the third magnetic circuit element 50 are in a ratio of 3:2 at the most, i.e. of 1.5 at the most, the ratio in the present case being 3.8 : 2.9, i.e. 1.31, as can be seen in FIG. 9. In the construction of the reel drive device 35 as shown in FIG. 9 the third magnetic circuit element 50 has an axial thickness T1 of approximately 3.5 mm in a radial area RB1 which extends away from its periphery towards the disc axis 46, which area in the present case corresponds to the whole outer radius of the third magnetic circuit element 50.

The construction of the reel drive device 35, which is illustrated clearly in particular in FIG. 9, is a construction which is very stable as regards its shape, which is deformation-proof and which exhibits substantially no axial wobble, as a result of which the drive teeth 48, i.e. all the drive teeth 48, are disposed in level range that can be realized within extremely narrow tolerance limits, so that there are no variations in the axial height position of the drive teeth 48 and, as a consequence, the drive teeth 48 do not have any undesirable influence on the height position of a magnetic tape when the magnetic tape is driven with the aid of the drive teeth 48.

Figure 10:
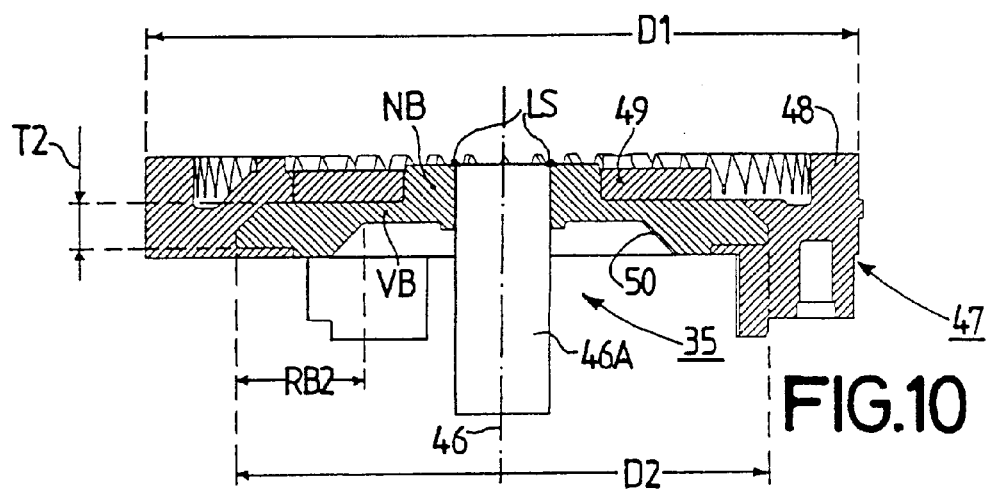
FIG. 10 shows, in a manner similar to FIG. 9, a reel drive device of a recording and reproducing apparatus in accordance with a second embodiment of the invention.
Figure 11:
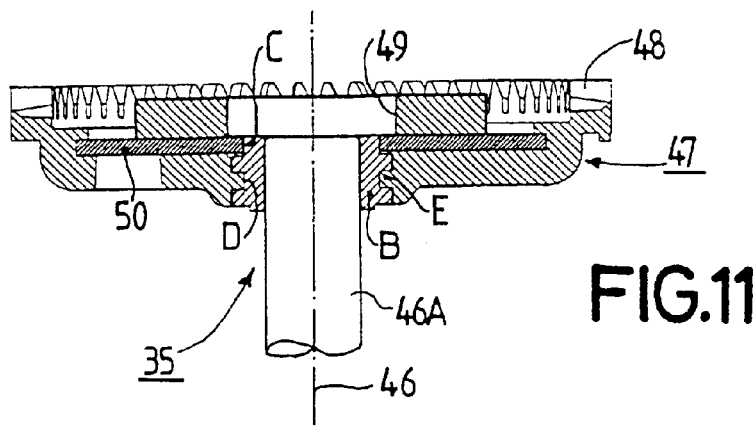
FIG. 11 shows, in a manner similar to FIGS. 9 and 10, a reel drive device of a prior-art recording and reproducing apparatus.

The reel drive device 35 shown in FIG. 10 is a modification of the reel drive device 35 shown in FIG. 9. In the reel drive device 35 shown in FIG. 10 the drive shaft 46A is also mounted directly in a bore of the third magnetic circuit element 50 and is locked in rotation to the third magnetic circuit element 50. Rotational locking is achieved by means of four laser welds LS, shown diagrammatically in FIG. 10.

In the reel drive device 35 shown in FIG. 10 the third magnetic circuit element 50 has a thickness T2 of approximately 3.5 mm in a radial area RB2 which extends away from its periphery towards the disc axis 46, which area corresponds to the substantially half the outer radius of the third magnetic circuit element 50. The comparatively thick outer portion of the third magnetic circuit element 50, which extends over the radial area RB2, is connected to the hub portion NB of the third magnetic circuit element 50 via a connecting portion VB of smaller thickness. However, the connecting portion VB of smaller thickness does not adversely affect the stable and deformation-proof construction of the third magnetic circuit element 50, because the stability and non-deformability of this element are primarily determined by the comparatively thick outer portion which extends over the radial area RB2.

The invention is not limited to the embodiments described hereinbefore. Tests have shown that even with a thickness T of the third magnetic circuit element 50 of at least 2.0 mm satisfactory results can be obtained as regards the stable shape and non-deformability of the reel drive device 50 and of the drive member 47.

What is claimed is:

1. A recording and/or reproducing apparatus (1) adapted to hold a cassette (2) which includes a supply reel (3) which is rotationally drivable with respect to a reel axis (3A), which supply reel serves to and is adapted to take up a record carrier (4) in the form of a tape and is connected to reel teeth (41) and is connected to a first magnetic circuit element (42), which magnetic circuit element serves to form magnetically acting holding means (43) for holding the supply reel (3) in the recording and/or reproducing apparatus (1), and having a reel drive device (35) for rotationally driving the supply reel (3), which reel drive device (35) has drive shaft (46A), which is rotationally drivable with respect to a disc axis (46) and a disc-shaped drive member (47), which is rotationally drivable with respect to the drive shaft (46A), which drive member (47) is made of a plastic and has drive-member-side drive teeth (48), which teeth serve to and are adapted to cooperate in a driving fashion with the reel teeth (41), and which drive member (47) is connected to a second magnetic circuit element (49), which serves to form the magnetically acting holding means (43) for holding the supply reel (3) in the recording and/or reproducing apparatus (1), the connection between a third magnetic circuit element (50) and the drive member (47) being made by insert-molding of the third magnetic circuit element (50), characterized in that the drive shaft (46A) is mounted directly in a bore of the third magnetic circuit element (50) and is locked in rotation to the third magnetic circuit element (50), and the third magnetic circuit element (50) is formed by an element which is finished by means of a turning operation, and the outer diameter (D1) of the drive-member-side drive teeth (48) and the outer diameter (D2) of the third magnetic circuit element (50) are in a ratio of 3:2 at the most, and the third magnetic circuit element (50) has an axial thickness (T1, T2) of at least 2.0 mm in a radial area (RB1, RB2) which extends away from its periphery towards the disc axis (46), which area corresponds to at least one third of the outer radius of the third magnetic circuit element (50).

2. A recording and/or reproducing apparatus (1) as claimed in claim 1, characterized in that the outer diameter (D1) of the drive-member-side drive teeth (48) and the outer diameter (D2) of the third magnetic circuit element (50) are in a ratio within a range of between 4:3 and 5:4.

3. A recording and/or reproducing apparatus (1) as claimed in claim 1, characterized in that the third magnetic circuit element (50) has an axial thickness (T1, T2) of at least 2.0 mm in a radial area (RB1, RB2) which extends away from its periphery towards the disc axis (46), which area corresponds to at least one half of the outer radius of the third magnetic circuit element (50).

4. A recording and/or reproducing apparatus (1) as claimed in claim 3, characterized in that the third magnetic circuit element (50) has an axial thickness (T1) of at least 2.0 mm in a radial area (RB1) which extends away from its periphery towards the disc axis (46), which area corresponds to the whole outer radius of the third magnetic circuit element (50).

5. A recording and/or reproducing apparatus (1) as claimed in claim 4, characterized in that the third magnetic circuit element (50) has a thickness (T1) within a range of between 2.0 mm and 5.0 mm.

6. A recording and/or reproducing apparatus (1) as claimed in claim 5, characterized in that the third magnetic circuit element (50) has a thickness of approximately 3.5 mm.

7. A recording and/or reproducing apparatus (1) as claimed in claim 1, characterized in that the third magnetic circuit element (50) consists of a magnetizable steel and forms a magnetic yoke.

8. A recording and/or reproducing apparatus (1) as claimed in claim 7, characterized in that the second magnetic circuit element (49) is formed by an annular magnet which is connected to the third magnetic circuit element (50).

* * * * *